United States Patent
Tatewaki

(10) Patent No.: US 8,992,380 B2
(45) Date of Patent: Mar. 31, 2015

(54) VEHICLE CONTROL DEVICE

(75) Inventor: Keichi Tatewaki, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 14/240,626

(22) PCT Filed: Jul. 19, 2012

(86) PCT No.: PCT/JP2012/068274
§ 371 (c)(1),
(2), (4) Date: Feb. 24, 2014

(87) PCT Pub. No.: WO2013/031410
PCT Pub. Date: Mar. 7, 2013

(65) Prior Publication Data
US 2014/0221154 A1 Aug. 7, 2014

(30) Foreign Application Priority Data
Aug. 31, 2011 (JP) ................................. 2011-188284

(51) Int. Cl.
| F16H 61/00 | (2006.01) |
| B60W 10/107 | (2012.01) |
| F16H 61/12 | (2010.01) |
| F16H 9/16 | (2006.01) |

(52) U.S. Cl.
CPC ............ B60W 10/107 (2013.01); F16H 61/12 (2013.01); F16H 9/16 (2013.01); B60W 2510/0241 (2013.01); B60W 2510/107 (2013.01)
USPC .......................................................... 477/45

(58) Field of Classification Search
None
See application file for complete search history.

(56) References Cited

U.S. PATENT DOCUMENTS

| 6,849,030 B2 * | 2/2005 | Yamamoto et al. ........... 477/159 |
| 2012/0088629 A1 * | 4/2012 | Aoyama et al. ................. 477/39 |
| 2013/0260960 A1 * | 10/2013 | Aoyama et al. ................. 477/45 |
| 2014/0106933 A1 * | 4/2014 | Tatewaki et al. ................ 477/92 |
| 2014/0207348 A1 * | 7/2014 | Wakayama et al. ............. 701/54 |
| 2014/0221154 A1 * | 8/2014 | Tatewaki ......................... 477/45 |

FOREIGN PATENT DOCUMENTS

| EP | 0908343 A2 * | 4/1999 | ............. B60K 6/365 |
| EP | 1158215 A2 * | 11/2001 | ............. F16H 61/00 |
| EP | 1468862 A2 * | 10/2004 | ............. B60K 41/14 |
| JP | 2003-329126 A | 11/2003 | |
| JP | 2004-301230 A | 10/2004 | |
| JP | 2010-078022 A | 4/2010 | |
| JP | 2010-179860 A | 8/2010 | |
| WO | WO 2004102041 A1 * | 11/2004 | ............. F16H 41/14 |

* cited by examiner

Primary Examiner — Dirk Wright
(74) Attorney, Agent, or Firm — Foley & Lardner LLP

(57) ABSTRACT

A vehicle control device for controlling a vehicle with an oil pump to be driven by rotation generated by a drive source and transmitted thereto and a continuously variable transmission including a power transmission member mounted between two pulleys includes coast stop control means configured to execute a coast stop control in which the drive source is stopped during vehicle running when a predetermined condition holds, and hydraulic pressure control means configured to execute a pulley pressure control in which a hydraulic pressure supplied to the pulley is increased such that frictional heat generated between the pulley and the power transmission member does not exceed upper limit frictional heat, below which the pulley or the power transmission member is not degraded, when the coast stop control is stopped, the drive source is restarted and the hydraulic pressure is supplied from the oil pump.

17 Claims, 7 Drawing Sheets

VEHICLE CONTROL DEVICE

TECHNICAL FIELD

The present invention relates to a vehicle control device.

BACKGROUND ART

Conventionally, a device for increasing a pressing force of a continuously variable transmission, i.e. a thrust force of a pulley when slippage occurs in the continuously variable transmission is disclosed in JP2004-301230A.

SUMMARY OF INVENTION

If slippage occurs between a pulley and a belt of a continuously variable transmission, frictional heat generated between the pulley and the belt increases, whereby a contact part between the pulley and the belt is overheated and the durability of the pulley or the belt is reduced.

The frictional heat changes according to a slip amount and a thrust force of the pulley, i.e. a pulley pressure. If the slip amount is large, the frictional heat increases even if the thrust force of the pulley is small. On the other hand, even if the slip amount is small, the frictional heat increases if the thrust force of the pulley is large.

Accordingly, the slip amount and the thrust force of the pulley need to be considered to suppress slippage between the pulley and the belt.

However, in the above invention, no consideration is given on an increase in the frictional heat due to an increase in the thrust force of the pulley, which leads to a problem that the contact part between the pulley and the belt is overheated by increasing the thrust force of the pulley, thereby possibly welding the pulley and the belt or degrading the pulley or the belt due to welding.

The present invention was developed to solve such a problem and aims to suppress the welding of a pulley and a belt and the degradation of the pulley or the belt due to welding.

A vehicle control device according to a certain aspect of the present invention is a vehicle control device for controlling a vehicle with a drive source, an oil pump to be driven by rotation generated by the drive source and transmitted thereto, and a continuously variable transmission provided between the drive source and drive wheels and including a power transmission member mounted between two pulleys, and includes coast stop control means configured to execute a coast stop control in which the drive source is stopped during vehicle running when a predetermined condition holds, and hydraulic pressure control means configured to execute a pulley pressure control in which a hydraulic pressure supplied to the pulley is increased such that frictional heat generated between the pulley and the power transmission member does not exceed upper limit frictional heat, below which the pulley or the power transmission member is not degraded, when the coast stop control is stopped, the drive source is restarted and the hydraulic pressure is supplied from the oil pump to the pulley.

According to this aspect, the degradation of the pulley or the power transmission member can be suppressed by increasing the hydraulic pressure supplied to the pulley such that the frictional heat generated between the pulley and the power transmission member does not exceed the upper limit frictional heat after the coast stop control is stopped.

DESCRIPTION OF EMBODIMENTS

Hereinafter, embodiments of the present invention are described in detail based on the drawings.

Figure 1:
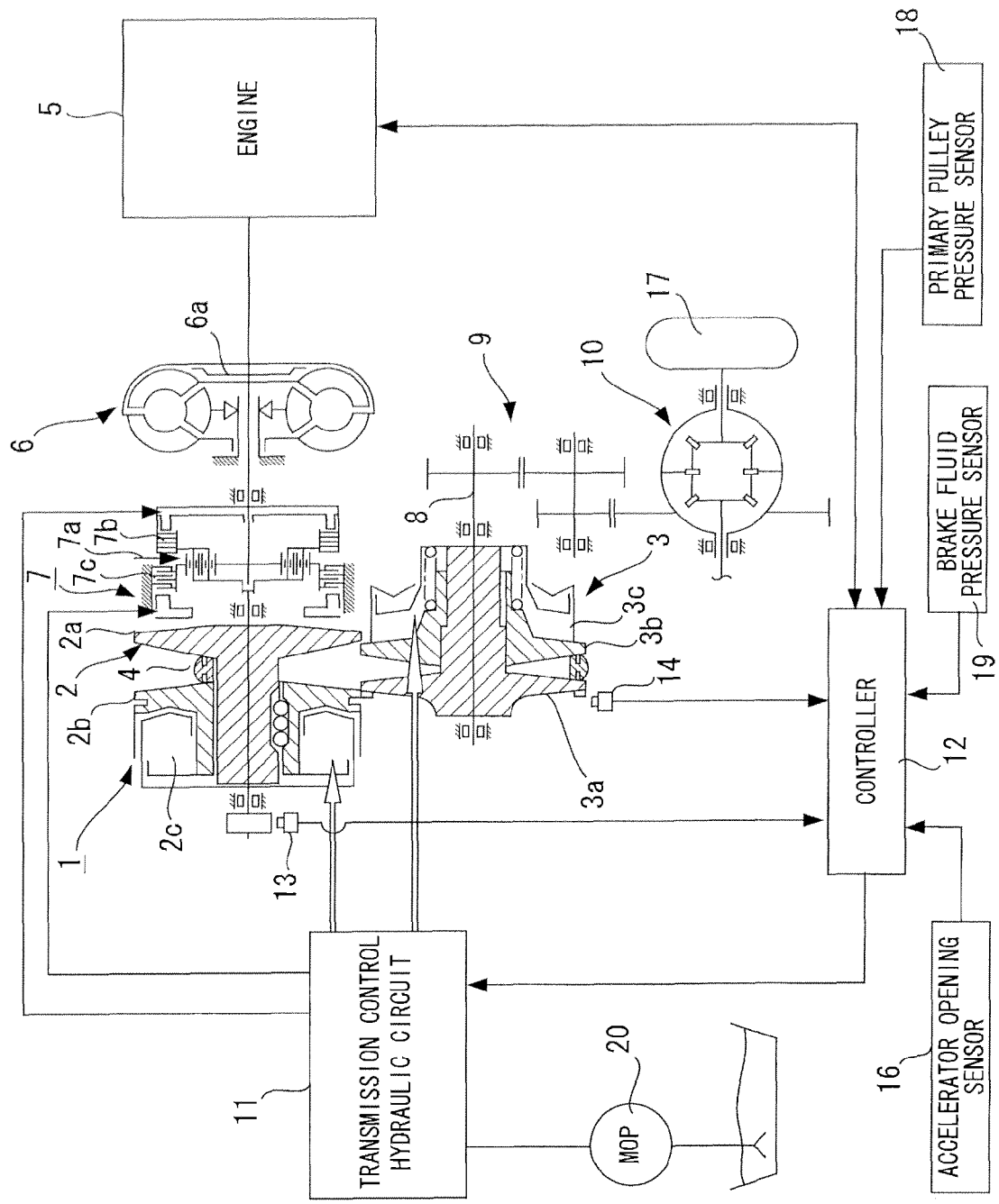
FIG. 1 is a schematic diagram showing a vehicle of a first embodiment.

FIG. 1 is a schematic diagram showing a vehicle of the present embodiment. The vehicle includes an engine 5, a torque converter 6, a forward/reverse switching mechanism 7, a continuously variable transmission 1, a controller 12 and an oil pump 20.

The continuously variable transmission 1 includes a primary pulley 2, a secondary pulley 3 and a belt 4. The primary pulley 2 and the secondary pulley 3 are so arranged that V-grooves thereof are aligned. The belt 4 is mounted between the V-groove of the primary pulley 2 and that of the secondary pulley 3.

The primary pulley 2 includes a fixed conical plate 2a and a movable conical plate 21) and the V-groove is formed by the fixed conical plate 2a and the movable conical plate 2b.

The secondary pulley 3 includes a fixed conical plate 3a and a movable conical plate 3b and the V-groove is formed by the fixed conical plate 3a and the movable conical plate 3b.

The movable conical plate 2b moves in an axial direction by supplying or discharging a primary pulley pressure produced by using a line pressure as a source pressure into or from a primary pulley chamber 2c. The movable conical plate 3b moves in an axial direction by supplying or discharging a secondary pulley pressure produced by using the line pressure as a source pressure into or from a secondary pulley chamber 3c. In this way, the width of the V-groove of the primary pulley 2 and that of the V-groove of the secondary pulley 3 change and the belt 4 is frictionally engaged with the conical plates to transmit power between the primary pulley 2 and the secondary pulley 3.

The rotation of the primary pulley 2 is transmitted to the secondary pulley 3 via the belt 4 and the rotation of the secondary pulley 3 is then transmitted to drive wheels 17 via an output shaft 8, a gear set 9 and a differential gear device 10.

The engine 5 is arranged coaxially with the primary pulley 2 and the torque converter 6 and the forward/reverse switching mechanism 7 are successively provided from the side of the engine 5 between the engine 5 and the primary pulley 2.

The torque converter 6 includes a lock-up clutch 6a. The torque converter 6 is switched to a lock-up state where the lock-up clutch 6a is completely engaged, a converter state where the lock-up clutch 6a is completely released and a slip state where the lock-up clutch 6a is half-engaged.

The forward/reverse switching mechanism 7 includes a double pinion planetary gear set 7a as a main constituent element, a sun gear thereof is coupled to the engine 5 via the torque converter 6 and a carrier thereof is coupled to the primary pulley 2. The forward/reverse switching mechanism 7 further includes a forward clutch 7b directly coupling the sun gear and the carrier of the double pinion planetary gear set 7a and a reverse brake 7c fixing a ring gear. The forward/reverse switching mechanism 7 transmits input rotation from the engine 5 by way of the torque converter 6 to the primary pulley 2 as it is when the forward clutch 7b is engaged, and transmits the input rotation from the engine 5 by way of the torque converter 6 to the primary pulley 2 while reversing and decelerating it when the reverse brake 7c is engaged.

The oil pump 20 is driven by a part of the rotation of the engine 5 transmitted thereto and supplies oil, which becomes a line pressure, to a transmission control hydraulic circuit 11.

The transmission control hydraulic circuit 11 includes pressure regulating valves and the like and regulates the primary pulley pressure and the secondary pulley pressure in response to a signal from the controller 12. The transmission control hydraulic circuit 11 regulates engagement hydraulic pressures of the forward clutch 7b that is engaged when a forward travel range is selected and the reverse brake 7c that is engaged when a reverse travel range is selected in response to a signal from the controller 12.

To the controller 12 are input a signal from a primary pulley rotation speed sensor 13 for detecting a primary pulley rotation speed, a signal from a secondary pulley rotation speed sensor 14 for detecting a secondary pulley rotation speed, a signal from an accelerator opening sensor 16 for detecting an accelerator pedal depression amount, a signal from a primary pulley pressure sensor 18 for detecting a primary pulley pressure, a signal from a brake fluid pressure sensor 19 for detecting a brake fluid pressure, etc. The controller 12 outputs signals for controlling the continuously variable transmission 1 and the engine 5 based on these signals.

The controller 12 is composed of a CPU, a ROM, a RAM and the like and each function is exhibited by reading a program stored in the ROM by the CPU.

The controller 12 executes a coast stop control described below to suppress a fuel consumption amount and improve fuel economy.

The coast stop control is a control for suppressing the fuel consumption amount by automatically stopping the engine 5 while the vehicle is running in a low vehicle speed region. The coast stop control is common to a fuel-cut control executed when an accelerator is off in that fuel supply to the engine 5 is stopped, but differs therefrom in that a power transmission path between the engine 5 and the drive wheels 17 is cut off to completely stop the rotation of the engine 5 by releasing the lock-up clutch 6a. When the rotation of the engine 5 is completely stopped, a discharge pressure of the oil pump 20 becomes zero and the forward clutch 7b and the reverse brake 7c of the forward/reverse switching mechanism 7 are released.

In executing the coast stop control, the controller 12 first judges, for example, coast stop conditions (predetermined condition) a to e listed below. These conditions are, in other words, conditions for judging whether or not a driver has an intention to stop the vehicle.

a: Accelerator pedal is not depressed at all (accelerator pedal depression amount=0).

b: Brake pedal is depressed (brake fluid pressure is not lower than a predetermined value).

c: Vehicle speed is a predetermined coast stop starting vehicle speed or lower.

d: Lock-up clutch 6a is released.

e: Speed ratio of the continuously variable transmission 1 is lowest.

When all of these coast stop conditions are satisfied, the controller 12 executes the coast stop control.

If any of the above coast stop conditions is no longer satisfied during the coast stop control, the controller 12 stops the coast stop control and restarts the engine 5.

The controller 12 controls the primary pulley pressure such that the primary pulley 2 and the belt 4 are not welded or degraded due to welding (hereinafter, this is merely referred to as degradation) due to frictional heat between the primary pulley 2 and the belt 4 immediately after the coast stop control is stopped and the engine 5 is restarted.

During the coast stop control, the forward clutch 7b and the reverse brake 7c of the forward/reverse switching mechanism 7 are released and the primary pulley pressure is low. However, since the vehicle is running, the primary pulley 2 is rotated by the rotation of the drive wheels 17.

After the coast stop control is stopped and the engine 5 is restarted, a hydraulic pressure is first supplied to the continuously variable transmission 1 to sufficiently increase a belt pressing force (hydraulic pressure) on the primary pulley 2 and the secondary pulley 3 so that slippage does not occur between the belt 4 and the primary pulley 2 and between the belt 4 and the secondary pulley 3 even if the rotation from the engine 5 is transmitted. Then, the forward clutch 7b or the reverse brake 7c of the forward/reverse switching mechanism 7 is engaged.

Figure 2:
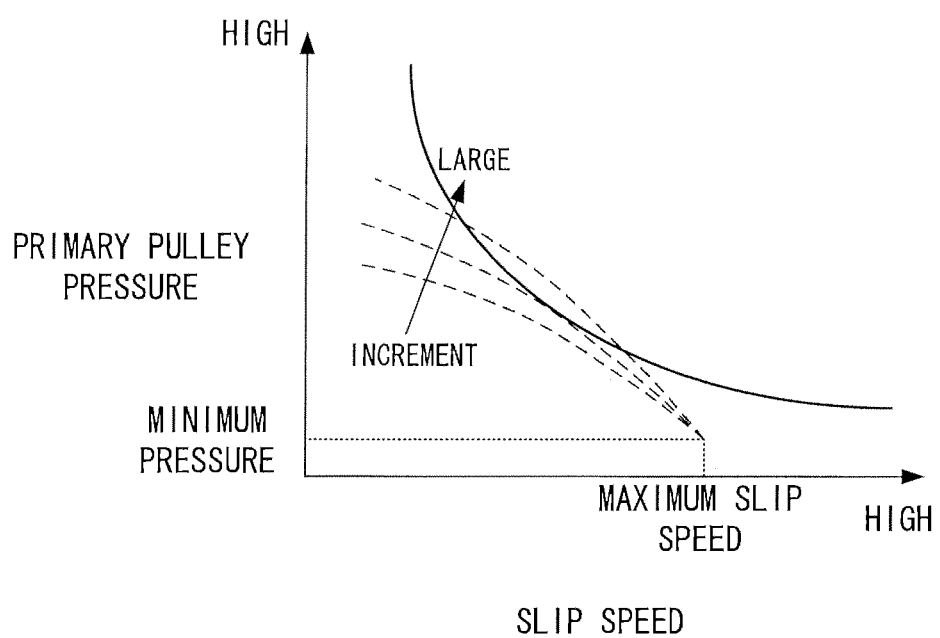
FIG. 2 is a map showing a relationship of a slip amount, a primary pulley pressure and frictional heat.

Here, a relationship of a slip speed, the primary pulley pressure and the frictional heat is described using FIG. 2.

The frictional heat between the belt 4 and the primary pulley 2 can be calculated by multiplying a slip speed between the primary pulley 2 and the belt 4 and a thrust force of the primary pulley 2, i.e. a pressing force of the belt 4 on the primary pulley 2. The slip speed can be calculated based on Equations (1), (2).

$$\text{Slip speed} = \text{slip rotation speed} \times \text{primary pulley running radius} \quad \text{Equation (1)}$$

$$\text{Slip rotation speed} = \text{primary pulley rotation speed} - \text{pulley ratio} \times \text{secondary pulley rotation speed} \quad \text{Equation (2)}$$

The coast stop control is executed after the speed ratio of the continuously variable transmission 1 becomes lowest. Thus, the primary pulley running radius is a contact radius of the belt 4 on the primary pulley 2 when the speed ratio is lowest. Further, the pulley ratio is a value obtained by dividing a secondary pulley running radius when the speed ratio is lowest by the primary pulley running radius. The secondary pulley running radius is a contact radius of the belt 4 on the secondary pulley 3 when the speed ratio is lowest. Since the slip rotation speed is zero when belt slippage does not occur, the slip speed is also zero.

Since the pressing force of the belt 4 is generated by the primary pulley pressure, the frictional heat can be represented by a relationship between the slip speed and the primary pulley pressure. In FIG. 2, upper limit frictional heat is shown in a solid line. When the frictional heat becomes higher than the upper limit frictional heat, the primary pulley 2 or the belt 4 is degraded by the frictional heat generated between the primary pulley 2 and the belt 4.

To prevent such degradation, the primary pulley pressure has to be lowered when the slip speed is high. The primary pulley pressure can be increased when the slip speed becomes lower. By increasing the primary pulley pressure in a range not exceeding the upper limit frictional heat, the slip speed decreases due to friction between the belt 4 and the primary pulley 2.

Figure 3:
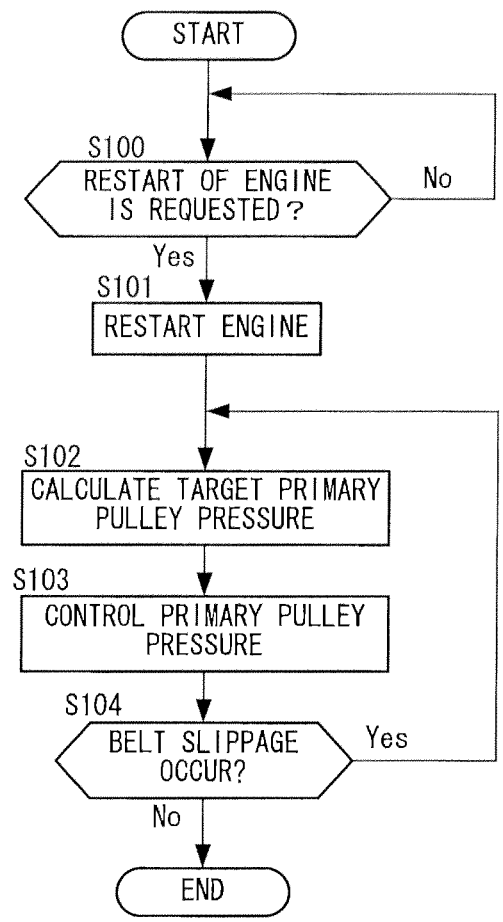
FIG. 3 is a flow chart showing a coast stop control of the first embodiment.

Next, the coast stop control of this embodiment is described using a flow chart of FIG. 3. Here, it is assumed that the coast stop control is executed.

In step S100, the controller 12 determines whether a restart of the engine 5 is requested or not. Specifically, the controller 12 determines whether or not all the coast stop conditions described above are satisfied. If any of the coast stop conditions is not satisfied, the controller 12 judges the restart of the engine 5 is requested and proceeds to step S101.

In Step S101, the controller 12 stops the coast stop control and restarts the engine 5.

In Step S102, the controller 12 calculates a target primary pulley pressure. Specifically, the controller 12 calculates a new target primary pulley pressure by adding a predetermined increment (pulley pressure increment) to a current target primary pulley pressure. The predetermined increment is a value set in advance and an increment of the primary pulley pressure per unit time. After the engine 5 is restarted, the target primary pulley pressure is a minimum pressure set in advance and the target primary pulley pressure is set at a value obtained by adding the predetermined increment to the minimum pressure as an initial value of this control.

The predetermined increment is so set as not to cause degradation due to the frictional heat between the belt 4 and the primary pulley 2 when the belt 4 slips at a predicted maximum slip speed (predicted slip speed) in the case of belt slippage during the coast stop control.

The coast stop control is executed after a vehicle speed reaches a coast stop starting vehicle speed and the speed ratio of the continuously variable transmission 1 becomes lowest. Thus, the maximum slip speed can be set based on the primary pulley rotation speed and the secondary pulley rotation speed when the vehicle stops due to sudden deceleration simultaneously with the start of the coast stop control. That is, the slip speed calculated from the coast stop starting vehicle speed and the lowest speed ratio is the maximum slip speed.

If the maximum slip speed is set in this way, the primary pulley pressure changes as shown in broken lines of FIG. 2 when the primary pulley pressure is changed at certain increments in relation to the maximum slip speed and the minimum pressure of the primary pulley 2 during the coast stop control. In FIG. 2, changes in the primary pulley pressure in the case of increasing at three increments are shown in broken lines as an example.

If the increment is set to be excessively large, the product of the slip speed and the primary pulley pressure becomes higher than the upper limit frictional heat and the primary pulley 2 or the belt 4 is degraded. On the other hand, if the increment is set to be excessively small, neither the primary pulley 2 nor the belt 4 is degraded, but a time necessary to increase the primary pulley pressure to a pressure at which the belt does not slip becomes longer even if the rotation is transmitted from the engine 5, whereby vehicle acceleration performance is deteriorated.

Accordingly, the predetermined increment is so set that the product of the slip speed and the primary pulley pressure does not exceed the upper limit frictional heat and the vehicle acceleration performance is not deteriorated. In the present embodiment, the increment at which a locus indicating a change of the product of the slip speed and the primary pulley pressure touches a line indicating the upper limit frictional heat is set as the predetermined increment.

The controller 12 stores the predetermined increment as data corresponding to the maximum slip speed.

In Step S103, the controller 12 controls the transmission control hydraulic circuit 11 so that the primary pulley pressure becomes the target primary pulley pressure.

In Step S104, the controller 12 determines whether or not belt slippage occurs. Specifically, the controller 12 determines whether or not a predetermined time has elapsed after the coast stop control is stopped. The predetermined time is a time until the primary pulley pressure increases to the pressure at which belt slippage does not occur between the belt 4 and the primary pulley 2, for example, even in the case of sudden deceleration when the primary pulley pressure is increased at the predetermined increment per unit time. The predetermined time is set in advance. The controller 12 determines that belt slippage does not occur and finishes this control if the predetermined time has elapsed after the stop of the coast stop control while determining a possibility of belt slippage and returning to Step S102 to repeat the above control if the predetermined time has not elapsed yet after the stop of the coast stop control.

When the request to restart the engine 5 is made during the coast stop control in this way, the above pulley pressure control is executed to suppress the degradation of the belt 4 or the primary pulley 2 due to the frictional heat generated between the belt 4 and the primary pulley 2.

After it is determined that belt slippage does not occur, a transition is made to a normal control. In the normal control, the controller 12 supplies the hydraulic pressure to the forward clutch 7*b* or the reverse brake 7*c* of the forward/reverse switching mechanism 7 to engage the forward clutch 7*b* or the reverse brake 7*c*.

It should be noted that, until it is determined that belt slippage does not occur after the stop of the coast stop control, the forward clutch 7*b* or the reverse brake 7*c* may be kept in a state where the rotation generated by the engine 5 is not transmitted to the continuously variable transmission 1 and such a hydraulic pressure as not to transmit the rotation may be supplied during the execution of the pulley pressure control.

Figure 4:
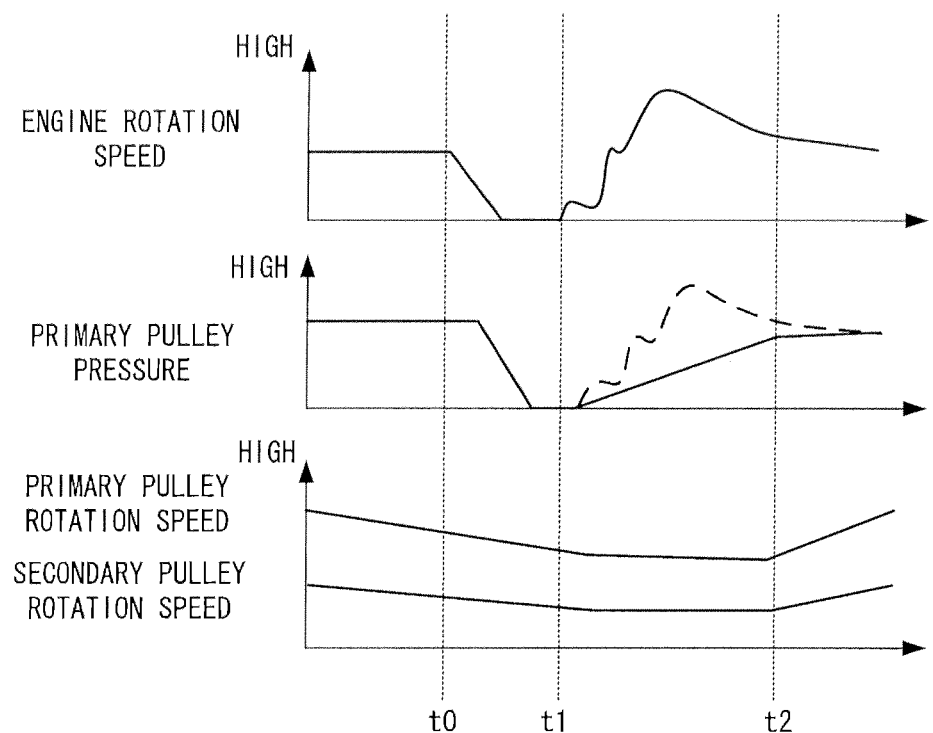
FIG. 4 is a time chart showing a change in the primary pulley pressure and the like in the case of executing the coast stop control of the first embodiment.

Next, a change in the primary pulley pressure and the like in the case of executing the coast stop control of the present embodiment are described using FIG. 4. FIG. 4 is a time chart showing a change in the primary pulley pressure and the like when belt slippage does not occur.

At time t0, the coast stop control is started. When the coast stop control is started, an engine rotation speed decreases and the discharge pressure of the oil pump 20 decreases, wherefore the primary pulley pressure also decreases.

When the coast stop control is stopped and the engine 5 is restarted at time t1, the engine rotation speed temporarily sharply increases. At this time, since the forward clutch 7*b* and the reverse brake 7*c* of the forward/reverse switching mechanism 7 are released, no torque is transmitted from the engine 5. When the engine 5 is restarted, the pulley pressure control is executed and the primary pulley pressure increases at the predetermined increment per unit time. A change in the primary pulley pressure in the case of not using the present embodiment is shown in a broken line. In the case of not using the present embodiment, the primary pulley pressure changes according to the rotation speed of the engine 5. Thus, when the engine rotation speed temporarily sharply increases, the primary pulley pressure also temporarily increases and the frictional heat between the primary pulley 2 and the belt 4 becomes higher and may exceed the upper limit frictional heat to degrade the primary pulley 2 or the belt 4. Since an increase in the primary pulley pressure is suppressed by executing the pulley pressure control in the present embodiment, the degradation of the primary pulley 2 or the belt 4 can be suppressed.

When the primary pulley pressure reaches a predetermined pressure at time t2, belt slippage does not occur, for example, even in the case of sudden deceleration. Thus, a transition is made to the normal control. Since the forward clutch 7b or the reverse brake 7c is engaged, the rotation of the engine 5 is transmitted to the primary pulley 2 and the primary pulley rotation speed and the secondary pulley rotation speed increase.

Effects of the first embodiment of the present invention are described.

In the case of using the engine 5 as a drive source, the engine rotation speed temporarily sharply increases when the engine 5 is started. Since the oil pump 20 discharges oil, to which a part of the rotation of the engine 5 is transmitted, the discharge pressure of the oil pump 20 also temporarily increases if the engine rotation speed sharply increases. Thus, in the case of not using the present embodiment, the primary pulley pressure of the primary pulley 2 to which the hydraulic pressure is supplied from the oil pump 20 also temporarily increases and the frictional heat generated between the primary pulley 2 and the belt 4 may become higher to degrade the primary pulley 2 or the belt 4.

In the present embodiment, the primary pulley pressure is increased such that the primary pulley 2 or the belt 4 is not degraded by the frictional heat generated between the primary pulley 2 and the belt 4 when the coast stop control is stopped and the engine 5 is restarted. This can suppress the degradation of the primary pulley 2 or the belt 4 even if belt slippage occurs between the primary pulley 2 and the belt 4.

The predetermined increment is set, assuming a case where belt slippage occurs at a possible maximum slip speed reached after the coast stop control is stopped, and the pulley pressure control is executed by increasing the primary pulley pressure at the predetermined increment per unit time. This can suppress the degradation of the primary pulley 2 or the belt 4 even when belt slippage occurs. Further, the primary pulley pressure can be increased at the predetermined increment set in advance and the degradation of the primary pulley 2 or the belt 4 can be suppressed without using a complicated logic. Further, the pulley pressure control can be executed without using signals from the primary pulley rotation speed sensor 13 and the like.

When the engine 5 is restarted, the engine 5 temporarily revs up and the discharge pressure of the oil pump 20 also temporarily increases in association with this rev-up. When the discharge pressure of the oil pump 20 also temporarily increases and, further, belt slippage occurs, the frictional heat generated between the belt 4 and the primary pulley 2 becomes higher and the frictional heat may exceed the upper limit frictional heat to degrade the primary pulley 2 or the belt 4.

However, even if the engine 5 is restarted, there is a time lag until the discharge pressure of the oil pump 20 increases due to a lag in supplying the hydraulic pressure. Accordingly, in the present embodiment, the pulley pressure control is started at a timing at which the engine 5 is restarted, i.e. a timing at which the coast stop control is stopped. This makes it possible to start the pulley pressure control before the discharge pressure of the oil pump 20 temporarily increases, prevent an increase in the primary pulley pressure due to the rev-up of the engine 5 and suppress the degradation of the primary pulley 2 or the belt 4.

The forward clutch 7b and the reverse brake 7c of the forward/reverse switching mechanism 7 are released until it is determined that the primary pulley pressure increases up to a pressure at which belt slippage does not occur after the stop of the coast stop control, and the forward clutch 7b or the reverse brake 7c is engaged after the primary pulley pressure increases to the pressure at which belt slippage does not occur. This can suppress belt slippage that occurs due to the transmission of the rotation from the engine 5 and suppress the degradation of the primary pulley 2 or the belt 4. Further, after the primary pulley pressure increases to the pressure at which belt slippage does not occur, a vehicle acceleration request can be quickly realized.

Note that a calculation method for the maximum slip speed is not limited to the above method and a possible maximum slip speed after the stop of the coast stop control may be actually calculated by an experiment or the like and the predetermined increment may be set according to the maximum slip speed. Further, the maximum slip speed may be set based on the primary pulley rotation speed when the coast stop control is stopped and the predetermined increment may be set according to the maximum slip speed. This can suppress the degradation of the primary pulley 2 or the belt 4, quickly increase the primary pulley pressure and quickly end belt slippage. Thus, a time until the forward clutch 7b or the reverse brake 7c is engaged after the coast stop control is stopped can be shortened and acceleration performance can be improved.

Next, a second embodiment of the present invention is described.

Figure 5:
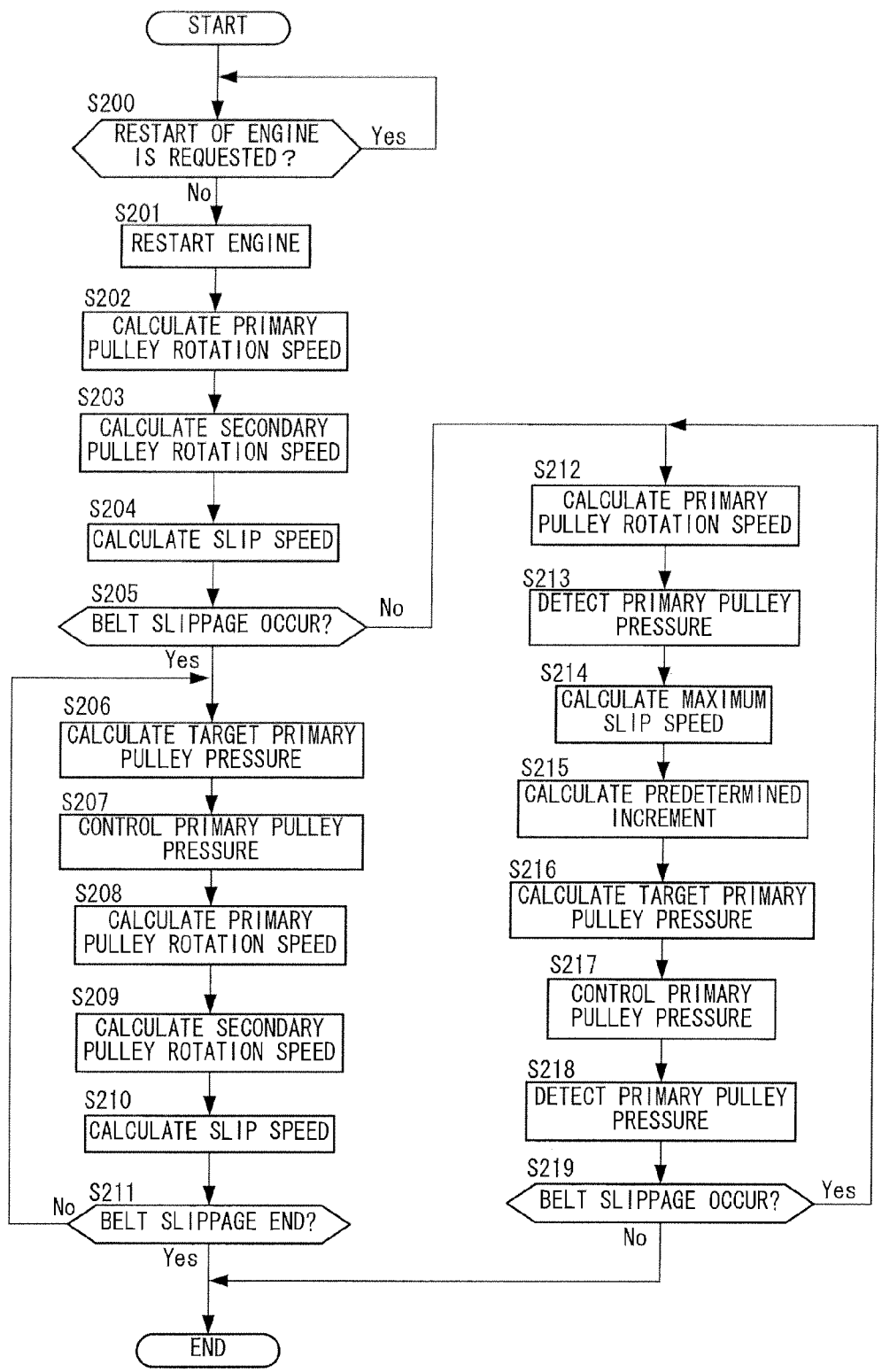
FIG. 5 is a flow chart showing a coast stop control of a second embodiment.

A coast stop control of the present embodiment is described using a flow chart of FIG. 5.

In Step S200, the controller 12 determines whether a restart of the engine 5 is requested or not. The controller 12 proceeds to Step S201 if the restart of the engine 5 is requested A specific determination method is the same as in Step S100.

In Step S201, the controller 12 stops the coast stop control and restarts the engine 5.

In Step S202, the controller 12 calculates a primary pulley rotation speed based on a signal from the primary pulley rotation speed sensor 13.

In Step S203, the controller 12 calculates a secondary pulley rotation speed based on a signal from the secondary pulley rotation speed sensor 14.

In Step S204, the controller 12 calculates a slip speed on the primary pulley 2 based on the primary pulley rotation speed and the secondary pulley rotation speed. The slip speed is calculated based on Equations (1) and (2).

In Step S205, the controller 12 determines whether or not belt slippage is occurring between the belt 4 and the primary pulley 2. Specifically, the controller 12 determines whether or not the slip speed is zero. The controller 12 proceeds to Step S206 unless the slip speed is zero while proceeds to Step S212 if the slip speed is zero.

In Step S206, the controller 12 calculates a target primary pulley pressure, at which upper limit frictional heat is reached, in relation to the slip speed from the map shown in FIG. 2.

In Step S207, the controller 12 controls the transmission control hydraulic circuit 11 so that the primary pulley pressure becomes the target primary pulley pressure.

In Step S208, the controller 12 calculates the primary pulley rotation speed based on a signal from the primary pulley rotation speed sensor 13.

In Step S209, the controller 12 calculates the secondary pulley rotation speed based on a signal from the secondary pulley rotation speed sensor 14.

In Step S210, the controller 12 calculates the slip speed. Specifically, the controller 12 calculates the slip speed on the primary pulley 2 based on the primary pulley rotation speed calculated in Step S208 and the secondary pulley rotation speed calculated in Step S209. A calculation method is the same as in Step S204.

In Step S211, the controller 12 determines whether or not belt slippage has ended based on the slip speed calculated in Step S210. Specifically, the controller 12 determines that belt slippage has ended and finishes this control if the slip speed is zero while determining that belt slippage has not ended yet and returning to Step S206 to repeat the above control unless the slip speed is zero.

In Step S212, the controller 12 calculates the primary pulley rotation speed based on a signal from the primary pulley rotation speed sensor 13.

In Step S213, the controller 12 calculates the primary pulley pressure based on a signal from the primary pulley pressure sensor 18.

In Step S214, the controller 12 calculates a maximum slip speed based on the primary pulley rotation speed. The maximum slip speed is a possible maximum slip speed at the current primary pulley rotation speed.

In Step S215, the controller 12 calculates a predetermined increment based on the maximum slip speed and the primary pulley pressure. A calculation method for the predetermined increment is the same as in Step S102, but the predetermined increment is calculated based on the possible maximum slip speed at the current primary pulley rotation speed and the primary pulley pressure. Although the predetermined increment is a constant value in the first embodiment, it is a value to be changed according to a current state of the primary pulley 2 in the present embodiment. The predetermined increment of the present embodiment is also set in advance by an experiment or the like by a method similar to that in Step S102 and stored as a value corresponding to the maximum slip speed and the primary pulley pressure, but may be calculated using the map of FIG. 2 or the like based on the maximum slip speed and the primary pulley pressure.

In Step S216, the controller 12 calculates a target primary pulley pressure. The controller 12 calculates a new target primary pulley pressure by adding the predetermined increment to a currently set target primary pulley pressure.

In Step S217, the controller 12 controls the transmission control hydraulic circuit 11 so that the primary pulley pressure becomes the target primary pulley pressure.

In Step S218, the controller 12 calculates the primary pulley pressure based on a signal from the primary pulley pressure sensor 18.

In Step S219, the controller 12 determines whether or not belt slippage occurs. Specifically, the controller 12 determines whether or not the primary pulley pressure calculated in Step S218 has reached a predetermined pressure. The predetermined pressure is a primary pulley pressure at which belt slippage does not occur between the belt 4 and the primary pulley 2, for example, even in the case of sudden deceleration. The controller 12 determines that belt slippage does not occur and finishes this control if the primary pulley pressure has reached the predetermined pressure while determining a possibility of the occurrence of belt slippage and returning to Step S212 to repeat the above control if the primary pulley pressure is lower than the predetermined pressure.

When the request to restart the engine 5 is made during the coast stop control in this way, the above pulley pressure control is executed to suppress the degradation of the belt 4 or the primary pulley 2 due to the frictional heat generated between the belt 4 and the primary pulley 2.

Figure 6:
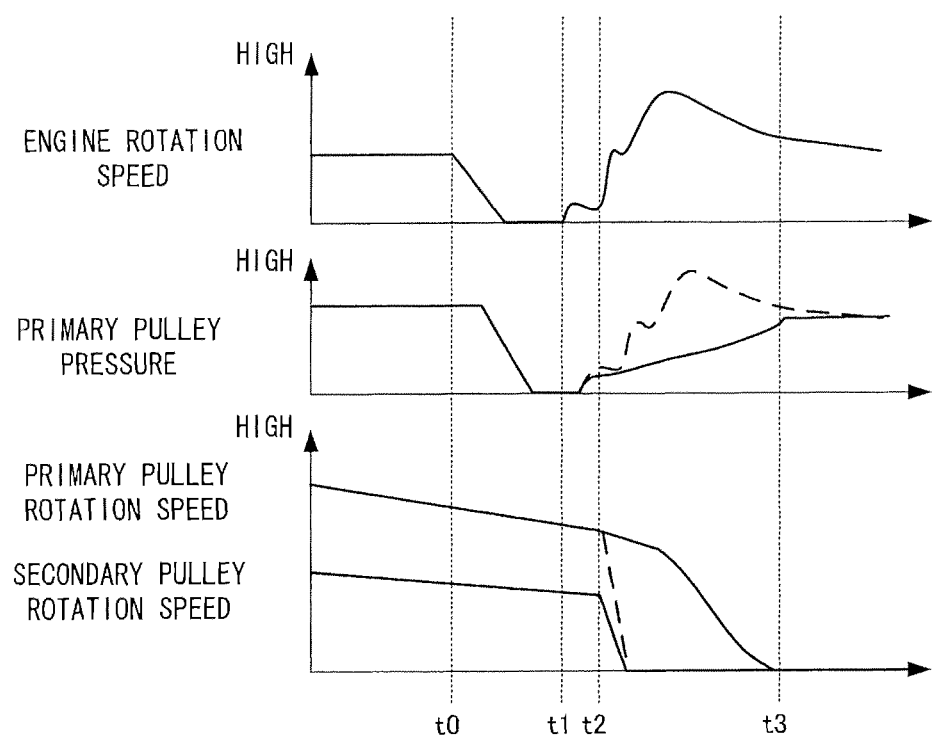
FIG. 6 is a time chart showing a change in a primary pulley pressure and the like in the case of executing the coast stop control of the second embodiment.
Figure 7:
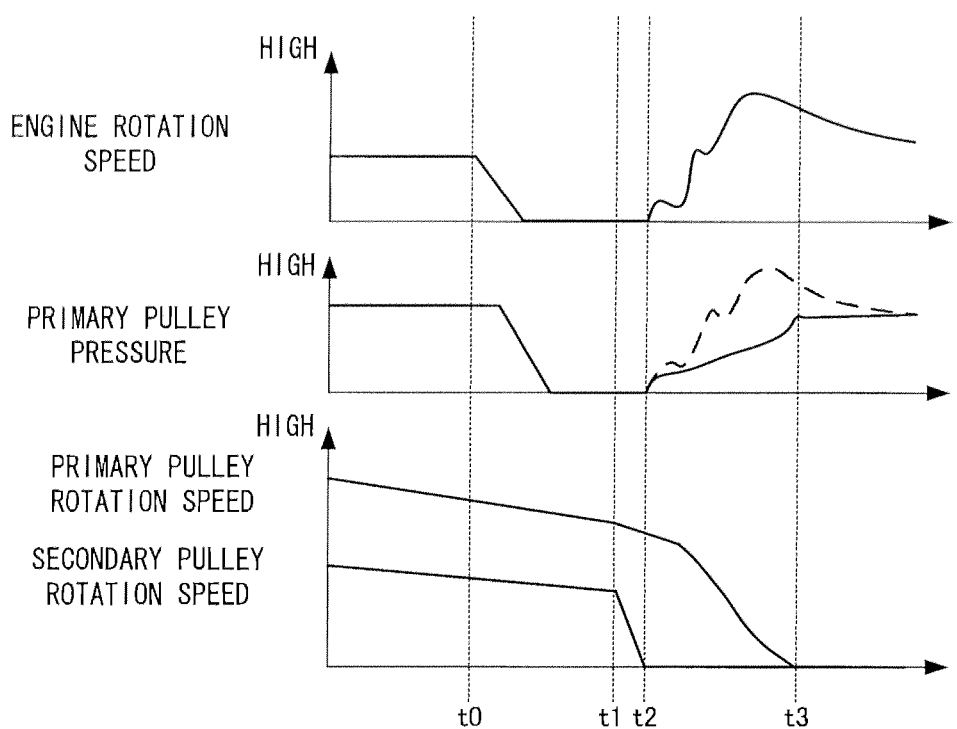
FIG. 7 is a time chart showing a change in the primary pulley pressure and the like in the case of executing the coast stop control of the second embodiment.

Next, a change in the primary pulley pressure and the like in the case of executing the coast stop control of the present embodiment are described using FIGS. 6 and 7.

FIG. 6 is a time chart showing a change in a primary pulley pressure and the like when belt slippage occurs. FIG. 6 is the time chart when a brake pedal is depressed after the coast stop control is stopped. As in FIG. 4, the change in the primary pulley pressure in the case of not using the present embodiment is shown by a broken line.

The coast stop control is started at time t0 and the coast stop control is stopped and the engine 5 is restarted at time t1.

At time t2, a depression amount of the brake pedal suddenly increases, whereby the vehicle is suddenly decelerated and belt slippage occurs. If belt slippage does not occur, the primary pulley rotation speed decreases together with the secondary pulley rotation speed as shown in the broken line. In the present embodiment, the primary pulley pressure increases at such a predetermined increment as not to cause welding due to the frictional heat between the belt 4 and the primary pulley 2 or degradation due to welding even at the maximum slip speed based on the current primary pulley rotation speed. Thus, even if belt slippage occurs, the frictional heat generated between the belt 4 and the primary pulley 2 does not exceed the upper limit frictional heat. As the primary pulley pressure increases, the primary pulley rotation speed decreases and belt slippage ends. In the case of not using the present embodiment, the primary pulley pressure increases according to the rotation speed of the engine 5, whereby the primary pulley 2 or the belt 4 may be degraded due to the frictional heat between the primary pulley 2 and the belt 4.

When belt slippage ends at time t3, a transition is made to a normal control. Here, the depression amount of the brake pedal is large and the vehicle stops.

FIG. 7 is a time chart showing a change in the primary pulley pressure and the like when belt slippage occurs. FIG. 7 is the time chart when the coast stop control is stopped after the brake pedal is depressed. As in FIG. 4, the change in the primary pulley pressure is shown by a broken line in the case of not using the present embodiment.

At time t0, the coast stop control is started.

At time t1, the depression amount of the brake pedal suddenly increases, the vehicle is suddenly decelerated and belt slippage occurs. Since the oil pump 20 does not discharge any pressure during the coast stop control, the primary pulley pressure is low and the frictional heat generated between the belt 4 and the primary pulley 2 does not exceed the upper limit frictional heat even if belt slippage occurs.

At time t2, the coast stop control is stopped. The primary pulley pressure increases based on the slip speed such that the frictional heat generated between the belt 4 and the primary pulley 2 does not exceed the upper limit frictional heat. In the case of not using the present embodiment, the primary pulley pressure increases according to the rotation speed of the engine 5, whereby the primary pulley 2 or the belt 4 may be degraded due to the frictional heat between the primary pulley 2 and the belt 4.

When belt slippage ends at time t3, a transition is made to the normal control. Here, the depression amount of the brake pedal is large and the vehicle stops.

Effects of the second embodiment of the present invention are described.

When belt slippage occurs between the primary pulley 2 and the belt 4, the slip speed is calculated and the primary pulley pressure is increased based on the slip speed such that the frictional heat generated between the primary pulley 2 and the belt 4 does not exceed the upper limit frictional heat. This can prevent the degradation of the primary pulley 2 or the belt 4 and quickly increase the primary pulley pressure. Thus, belt slippage can be quickly brought to an end, a time until the forward clutch 7b or the reverse brake 7c is engaged after the coast stop control is stopped can be shortened and acceleration performance can be improved.

When belt slippage does not occur, the currently possible maximum slip speed is calculated based on the primary pulley rotation speed, the predetermined increment is calculated based on the maximum slip speed and the primary pulley pressure, and the primary pulley pressure is increased at the predetermined increment per unit time. This can suppress the degradation of the primary pulley 2 or the belt 4 even when belt slippage occurs.

Although the continuously variable transmission 1 using the belt 4 is described in the above embodiments, a continuously variable transmission using a chain instead of the belt 4 may be used as a power transmission member. Further, a sub-transmission mechanism may be used instead of the forward/reverse switching mechanism 7.

Although the pulley pressure control is started at the timing at which the engine 5 is restarted in the above embodiments, it may be started at a timing at which the hydraulic pressure is discharged from the oil pump 20. Further, the pulley pressure control may also be started after the coast stop control is started and the primary pulley pressure becomes lower than a predetermined hydraulic pressure at which belt slippage does not occur. These can cause the pulley pressure control to be started before the discharge pressure of the oil pump 20 temporarily increases, prevent an increase in the primary pulley pressure due to the rev-up of the engine 5 and suppress the degradation of the primary pulley 2 or the belt 4 even if the engine 5 temporarily revs up.

Further, the controller 12 may predict the occurrence of belt slippage and start the pulley pressure control after the occurrence of belt slippage is predicted. The occurrence of belt slippage is predicted, for example, when sudden deceleration is predicted based on the operation of the brake pedal, when the vehicle is running on a rough road and a torque largely changes in the drive wheels 17 or when the primary pulley rotation speed is high. By starting the pulley pressure control when the occurrence of belt slippage is predicted, the degradation of the primary pulley 2 or the belt 4 can be suppressed if belt slippage actually occurs thereafter. By starting the pulley pressure control in an early stage even when belt slippage does not occur, the primary pulley pressure can be quickly increased to the pressure at which belt slippage does not occur and acceleration performance when the coast stop control is stopped can be improved. Further, if the occurrence of belt slippage is not predicted, i.e. if it is predicted that belt slippage does not occur, the primary pulley pressure can be increased in accordance with a change in the discharge pressure of the oil pump 20, and can be quickly increased, whereby acceleration performance when the coast stop control is stopped can be improved.

Particularly, it is preferable to predict the occurrence of belt slippage based on the operation of the brake pedal. For example, if a change amount of the brake fluid pressure per unit time is larger than a predetermined amount, the occurrence of belt slippage is predicted when a brake pedal operating speed per unit time is higher than a predetermined speed. Belt slippage can be predicted based on the discharge pressure of the oil pump 20, the acceleration/deceleration of the vehicle, a change amount of the engine rotation speed and the like besides the above. However, by these methods, the occurrence of belt slippage is predicted at a timing delayed from a timing at which belt slippage actually occurs due to the responsiveness of a sensor or a filtering process. If the occurrence of belt slippage is predicted based on the operation of the brake pedal, a delay of the prediction from actual belt slippage can be shortened.

The hydraulic pressure control of the primary pulley pressure of the above embodiments is finished when the vehicle stops. Alternatively, the hydraulic pressure control of the primary pulley pressure may be finished when the primary pulley rotation speed drops to or below a predetermined rotation speed at which the primary pulley 2 or the belt 4 is not degraded.

Although the embodiments of the present invention have been described above, the above embodiments are only an illustration of some application examples of the present invention and not intended to limit the technical scope of the present invention to the specific configurations of the above embodiments.

This application claims a priority of Japanese Patent Application No. 2011-188284 filed with the Japan Patent Office on Aug. 31, 2011, all the contents of which are hereby incorporated by reference.

The invention claimed is:

1. A vehicle control device for controlling a vehicle with a drive source, an oil pump to be driven by rotation generated by the drive source and transmitted thereto, and a continuously variable transmission provided between the drive source and drive wheels and including a power transmission member mounted between two pulleys, comprising:
   a coast stop control unit configured to execute a coast stop control in which the drive source is stopped during vehicle running when a predetermined condition holds; and
   a hydraulic pressure control unit configured to execute a pulley pressure control in which a hydraulic pressure supplied to the pulley is increased such that frictional heat generated between the pulley and the power transmission member does not exceed upper limit frictional heat, below which the pulley or the power transmission member is not degraded, when the coast stop control is stopped, the drive source is restarted and the hydraulic pressure is supplied from the oil pump to the pulley.

2. The vehicle control device according to claim 1, comprising a slip speed calculation unit configured to calculate a slip speed between the pulley and the power transmission member, wherein:
   the hydraulic pressure control unit executes the pulley pressure control based on the slip speed.

3. The vehicle control device according to claim 1, comprising:
   a pulley rotation speed detection unit configured to detect a pulley rotation speed;
   a pulley pressure detection unit configured to detect the hydraulic pressure supplied to the pulley; and
   a predicted slip speed calculation unit configured to calculate a predicted slip rotation speed based on the pulley rotation speed;
   wherein the hydraulic pressure control unit calculates a pulley pressure increment based on the hydraulic pressure supplied to the pulley and the predicted slip rotation speed and increases the hydraulic pressure supplied to the pulley at the pulley pressure increment per unit time.

4. The vehicle control device according to claim 1, comprising a predicted slip speed calculation unit configured to calculate a predicted slip speed between the pulley and the power transmission member based on a vehicle speed at the start of the coast stop control;

wherein the hydraulic pressure control unit calculates a pulley pressure increment based on the predicted slip speed and increases the hydraulic pressure supplied to the pulley at the pulley pressure increment per unit time.

5. The vehicle control device according to claim 1, wherein:
the hydraulic pressure control unit starts the pulley pressure control when the coast stop control is stopped.

6. The vehicle control device according to claim 1, wherein:
the hydraulic pressure control unit starts the pulley pressure control when the drive source is restarted and the hydraulic pressure is discharged from the oil pump.

7. The vehicle control device according to claim 1, comprising a pulley pressure detection unit configured to detect the hydraulic pressure supplied to the pulley;
wherein the hydraulic pressure control unit starts the pulley pressure control when the coast stop control is started and the hydraulic pressure supplied to the pulley becomes lower than a predetermined hydraulic pressure at which slippage does not occur between the pulley and the power transmission member.

8. The vehicle control device according to claim 1, comprising a slip prediction unit configured to predicting whether or not slippage occurs between the pulley and the power transmission member;
wherein the hydraulic pressure control unit starts the pulley pressure control when the occurrence of the slippage is predicted.

9. The vehicle control device according to claim 8, wherein:
the slip prediction unit predicts whether or not slippage occurs between the pulley and the power transmission member based on a brake pedal operation.

10. The vehicle control device according to claim 9, comprising a brake fluid pressure detection unit configured to detect a brake fluid pressure;
wherein the slip prediction unit predicts the occurrence of the slippage between the pulley and the power transmission member when a change amount of the brake fluid pressure per unit time is not less than a predetermined amount.

11. The vehicle control device according to claim 9, comprising a brake pedal operation amount detection unit configured to detect a brake pedal operation amount;
wherein the slip prediction unit predicts the occurrence of the slippage between the pulley and the power transmission member when a rate of change of the brake pedal operation amount per unit time is not lower than a predetermined rate.

12. The vehicle control device according to claim 1, wherein:
the hydraulic pressure control unit finishes the pulley pressure control when the vehicle stops.

13. The vehicle control device according to claim 1, comprising a pulley rotation speed detection unit configured to detect a pulley rotation speed;
wherein the hydraulic pressure control unit finishes the pulley pressure control when the pulley rotation speed drops to or below a predetermined rotation speed.

14. The vehicle control device according to claim 1, comprising:
a determination unit configured to determine whether or not slippage occurs between the pulley and the power transmission member;
a frictional engagement element arranged in series with the continuously variable transmission; and
a frictional engagement element control unit configured to release the frictional engagement element during the coast stop control and engage the frictional engagement element after it is determined that the slippage does not occur.

15. The vehicle control device according to claim 1, wherein the hydraulic pressure control unit executes the pulley pressure control by controlling a pressure regulating valve.

16. A control method for controlling a vehicle with a drive source, an oil pump to be driven by rotation generated by the drive source and transmitted thereto, and a continuously variable transmission provided between the drive source and drive wheels and including a power transmission member mounted between two pulleys, comprising:
executing a coast stop control for stopping the drive source during vehicle running when a predetermined condition holds; and
executing a pulley pressure control for increasing a hydraulic pressure supplied to the pulley such that frictional heat generated between the pulley and the power transmission member does not exceed upper limit frictional heat, below which the pulley or the power transmission member is not degraded, when the coast stop control is stopped, the drive source is restarted and the hydraulic pressure is supplied from the oil pump to the pulley.

17. A control device for controlling a vehicle with a drive source, an oil pump to be driven by rotation generated by the drive source and transmitted thereto, and a continuously variable transmission provided between the drive source and drive wheels and including a power transmission member mounted between two pulleys, comprising:
coast stop control means for executing a coast stop control for stopping the drive source during vehicle running when a predetermined condition holds; and
hydraulic pressure control means for executing a pulley pressure control for increasing a hydraulic pressure supplied to the pulley such that frictional heat generated between the pulley and the power transmission member does not exceed upper limit frictional heat, below which the pulley or the power transmission member is not degraded, when the coast stop control is stopped, the drive source is restarted and the hydraulic pressure is supplied from the oil pump to the pulley.

* * * * *